US012754147B2

(12) United States Patent
Tominaga

(10) Patent No.: US 12,754,147 B2
(45) Date of Patent: Oct. 6, 2026

(54) X-RAY INSPECTION APPARATUS

(71) Applicant: ISHIDA CO., LTD., Kyoto (JP)

(72) Inventor: Kota Tominaga, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 166 days.

(21) Appl. No.: 18/605,787

(22) Filed: Mar. 14, 2024

(65) Prior Publication Data

US 2024/0319117 A1 Sep. 26, 2024

(30) Foreign Application Priority Data

Mar. 20, 2023 (JP) ................................ 2023-043847

(51) Int. Cl.
*G01N 23/04* (2018.01)

(52) U.S. Cl.
CPC ....... *G01N 23/04* (2013.01); *G01N 2223/304* (2013.01); *G01N 2223/3308* (2013.01)

(58) Field of Classification Search
CPC ............. G01N 23/04; G01N 2223/304; G01N 2223/3308
See application file for complete search history.

(56) References Cited

U.S. PATENT DOCUMENTS 5,749,452 A 5/1998 Kanenwischer
2019/0000094 A1* 1/2019 Hjalmarsson .......... G01N 33/12
2021/0092969 A1* 4/2021 Hartwig ............. A22C 17/0093
2023/0093613 A1* 3/2023 Neale .................. B65G 41/001
198/369.2
2023/0305029 A1* 9/2023 Asai ....................... G01N 23/18

FOREIGN PATENT DOCUMENTS

EP 4130725 A1 2/2023
JP 2003-279500 A 10/2003
JP 2018-155561 A 10/2018

OTHER PUBLICATIONS

The extended European Search Report dated Aug. 5, 2024.

* cited by examiner

*Primary Examiner* — Hugh Maupin
(74) *Attorney, Agent, or Firm* — Spencer Fane LLP

(57) ABSTRACT

An X-ray inspection apparatus includes: a conveying unit; an irradiation unit configured to irradiate an article with an electromagnetic wave; a detection unit configured to detect the electromagnetic wave transmitted through the article; an inspection unit configured to inspect the article; and a determination unit configured to determine attachment of the conveying unit. The conveying unit includes first and second conveying units. The determination unit includes: a support portion attached to the first conveying unit; a swing member swingably attached to the second conveying unit and at least partially in contact with the support portion when the first and second conveying units are attached; and a sensor unit configured to detect whether the swing member is present at a predetermined position in a state where the swing member is in contact with the support portion.

6 Claims, 7 Drawing Sheets

X-RAY INSPECTION APPARATUS

TECHNICAL FIELD

The present disclosure relates to an X-ray inspection apparatus.

BACKGROUND

Conventionally, as described in Patent Literature 1 (Japanese Unexamined Patent Publication No. 2018-155561), an X-ray inspection apparatus having a pair of conveying units arranged side by side with an X-ray passing region interposed therebetween is known. In this apparatus, an X-ray irradiation unit is provided on one (an upper one) of the pair of conveying units, and an X-ray detection unit is provided on the other (a lower one) of the pair of conveying units. An X-ray emitted from the X-ray irradiation unit passes through an article, passes through the X-ray passing region, and enters the X-ray detection unit. The X-ray is converted into light and further converted into an electric signal, and an X-ray transmission image is generated in a control unit. Both the conveying units are provided with an X-ray shielding member that shields the X-ray at an end of the X-ray passing region. With this configuration, it is possible to determine whether each of the pair of conveying units is attached based on the X-ray transmission image.

SUMMARY

In the above-described conventional device, it is possible to determine whether each of the pair of conveying units is attached. Unlike this configuration, another configuration such as providing an interlock switch is also conceivable. However, in order to determine whether each of the pair of conveying units is attached, two interlock switches are required. This is disadvantageous in terms of cost and compactness (space saving).

An object of the present disclosure is to provide an X-ray inspection apparatus capable of determining attachment of the pair of conveying units with only one sensor unit.

(1) An X-ray inspection apparatus according to one aspect of the present disclosure includes: a conveying unit configured to convey an article; an irradiation unit configured to irradiate the article conveyed by the conveying unit with an electromagnetic wave; a detection unit configured to detect the electromagnetic wave emitted from the irradiation unit and transmitted through the article; an inspection unit configured to inspect the article based on a detection result of the detection unit; and a determination unit configured to determine attachment of the conveying unit. The conveying unit includes first and second conveying units arranged side by side with a passing region through which the electromagnetic wave from the irradiation unit to the detection unit passes therebetween. The determination unit includes: a support portion attached to the first conveying unit; a swing member swingably attached to the second conveying unit and at least partially in contact with the support portion when the first and second conveying units are attached; and a sensor unit configured to detect whether the swing member is present at a predetermined position in a state where the swing member is in contact with the support portion.

According to this X-ray inspection apparatus, when the first conveying unit is attached and the second conveying unit is further attached, at least a part of the swing member is in contact with the support portion. Then, only when this state (condition) is established, the sensor unit detects that the swing member is present at the predetermined position. Therefore, attachment of the pair of conveying units can be determined only by one sensor unit.

(2) In the X-ray inspection apparatus according to (1), the swing member may include a magnet, and the sensor unit may be a magnetic proximity switch for detecting whether the magnet is present at a predetermined position. In this case, since a position of the swing member can be detected in a non-contact manner, configuration of the sensor unit is simplified, and the degree of freedom in layout is also high.

(3) In the X-ray inspection apparatus according to (1) or (2), the support portion and the swing member may be arranged between a conveying surface of the first and second conveying units and a side wall of a housing extending in a vertical direction on a side of the conveying surface, and the sensor unit may be disposed on an inner surface side of the side wall. In this case, since the sensor unit is disposed inside the housing, a wide area of the conveying surface can be secured.

(4) In the X-ray inspection apparatus according to any one of (1) to (3), the second conveying unit may be provided with a restriction mechanism for restricting a swing range of the swing member. In this case, when the second conveying unit is attached, the swing member can be appropriately and reliably brought into contact with the support portion.

(5) In the X-ray inspection apparatus according to any one of (1) to (4), the inspection unit may stop irradiation with the electromagnetic wave when the determination unit does not determine attachment of the first and second conveying units. In this case, erroneous operation of the X-ray inspection apparatus is prevented.

(6) In the X-ray inspection apparatus according to any one of (1) to (5), the inspection unit may provide notification that there is an abnormality when the determination unit does not determine attachment of the first and second conveying units. In this case, the X-ray inspection apparatus can be prevented from being erroneously operated, and the X-ray inspection apparatus can be stopped even when any of the conveying units is detached during operation.

According to the present disclosure, attachment of the pair of conveying units can be determined only by one sensor unit.

DETAILED DESCRIPTION

Figure 1:
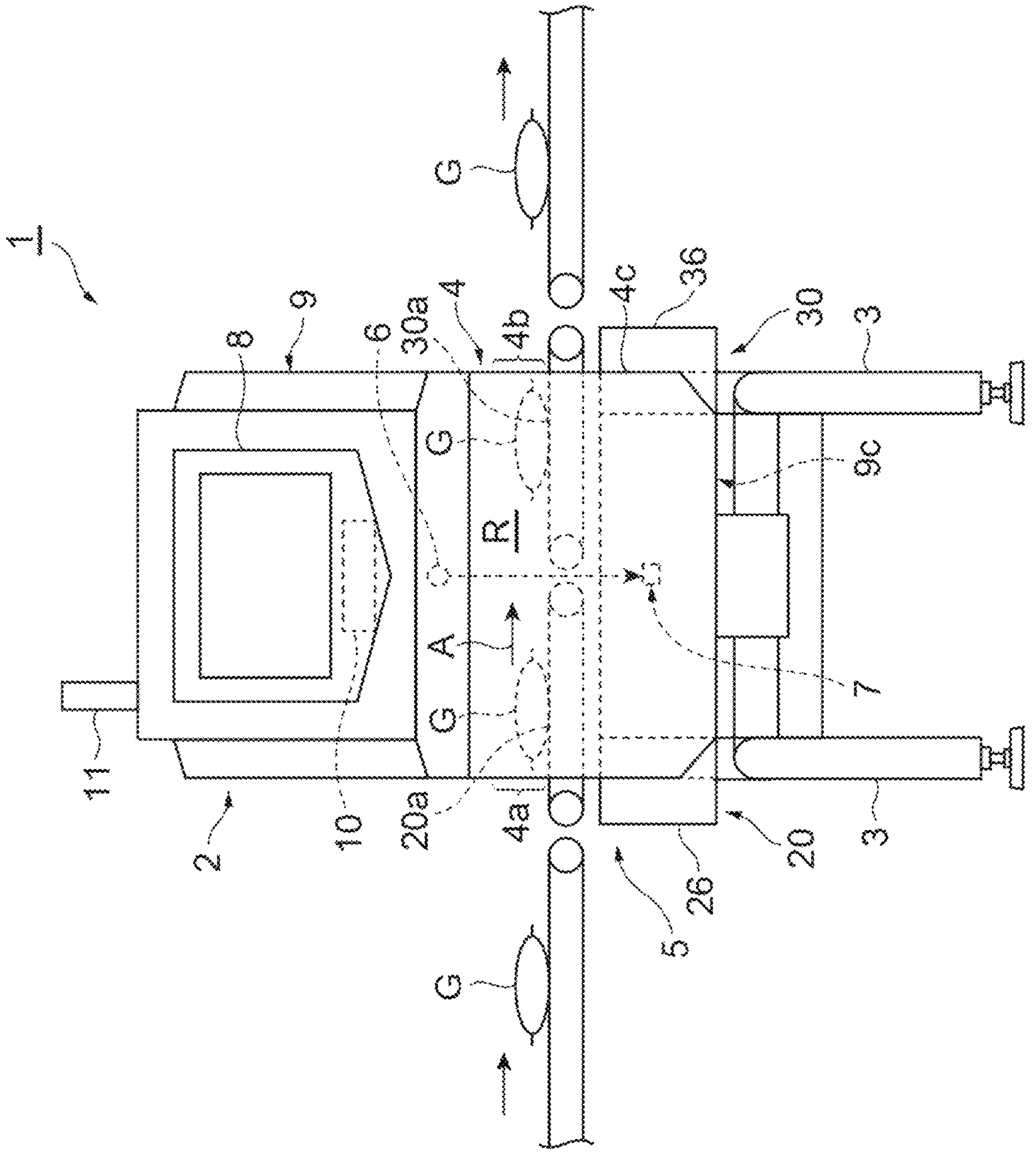
FIG. 1 is a front view of an X-ray inspection apparatus according to an embodiment of the present disclosure.

Hereinafter, an embodiment of the present invention will be described in detail with reference to the drawings. Note that in the description of the drawings, the same elements are denoted by the same reference numerals, and redundant description is omitted.

As illustrated in FIG. 1, an X-ray inspection apparatus 1 includes an apparatus body 2, support legs 3, a shield box (housing) 4, a conveying unit 5, an X-ray irradiation unit 6, an X-ray detection unit 7, a display operation unit (a notification unit) 8, and a control unit 10. The X-ray inspection apparatus 1 generates an X-ray transmission image of an article G while conveying the article G, and inspects the article G based on the X-ray transmission image (for example, storage number inspection, foreign matter mixing inspection, missing inspection, crack and chip inspection, and the like). The article G before the inspection is carried into the X-ray inspection apparatus 1 by a carry-in conveyor 20*a*. The article G after the inspection is carried out from the X-ray inspection apparatus 1 by a carry-out conveyor 30*a*. The article G determined as a defective product by the X-ray inspection apparatus 1 is distributed to an outside of a production line by a distribution device (not illustrated) disposed downstream of the carry-out conveyor 30*a*. The article G determined as a non-defective product by the X-ray inspection apparatus 1 passes through the distribution device as it is.

The apparatus body 2 houses the control unit 10 and the like. The support legs 3 support the apparatus body 2. The shield box 4 is provided in the apparatus body 2. The shield box 4 prevents leakage of X-rays to the outside. An inspection region R in which the article G is inspected by the X-ray is provided inside the shield box 4. A carry-in port 4*a* and a carry-out port 4*b* are formed in the shield box 4. The article G before inspection is carried into the inspection region R from the carry-in conveyor 20*a* through the carry-in port 4*a*. The article G after inspection is carried out from the inspection region R to the carry-out conveyor 30*a* via the carry-out port 4*b*. Each of the carry-in port 4*a* and the carry-out port 4*b* is provided with an X-ray shielding curtain (not illustrated) that prevents leakage of X-rays.

The conveying unit 5 is disposed in the shield box 4. The conveying unit 5 conveys the article G from the carry-in port 4*a* to the carry-out port 4*b* via the inspection region R in a conveying direction A. The conveying unit 5 is, for example, a belt conveyor stretched between the carry-in port 4*a* and the carry-out port 4*b*.

Figure 2:
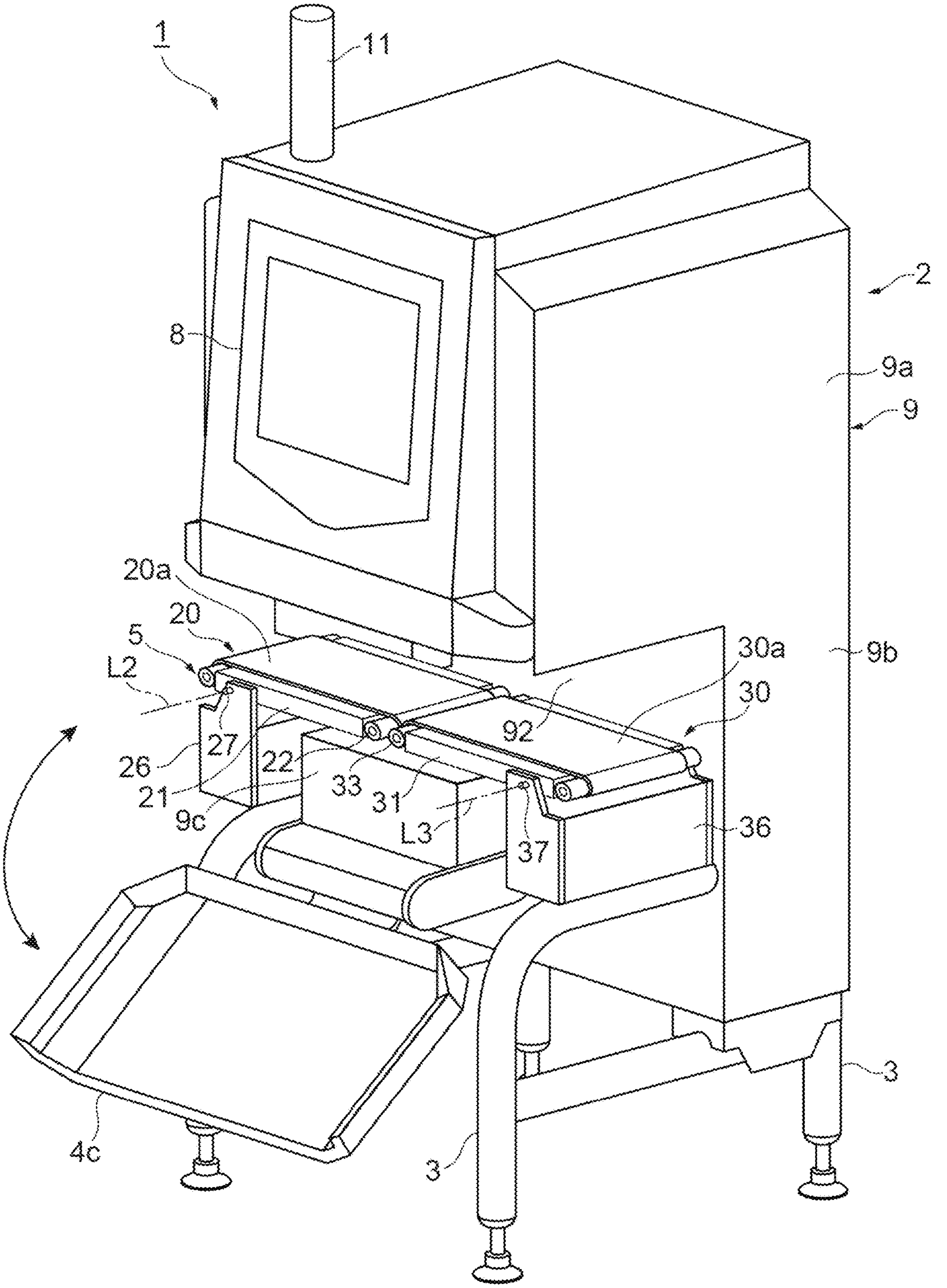
FIG. 2 is a perspective view of the X-ray inspection apparatus in FIG. 1.

The apparatus body 2 has, for example, a housing 9 made of a material capable of shielding electromagnetic waves such as X-rays. As illustrated in FIG. 2, the housing 9 includes an upper portion 9*a* provided with the display operation unit 8 on a front surface thereof, a back portion 9*b* extending in a vertical direction, and a lower portion 9*c* protruding forward from the back portion 9*b*. When viewed from the downstream side in the conveying direction A, a first wall portion 91 of the upper portion 9*a*, a second wall portion 92 of the back portion 9*b*, and a third wall portion 93 of the lower portion 9*c* form a U-shape opened forward (see FIG. 4), and portions of the carry-in conveyor 20*a* and the carry-out conveyor 30*a* near a passing region X (described later) are arranged in a space surrounded by these wall portions. A front surface of the shield box 4 is covered with a shielding cover 4*c* that is opened and closed at the time of maintenance or the like.

Figure 4:
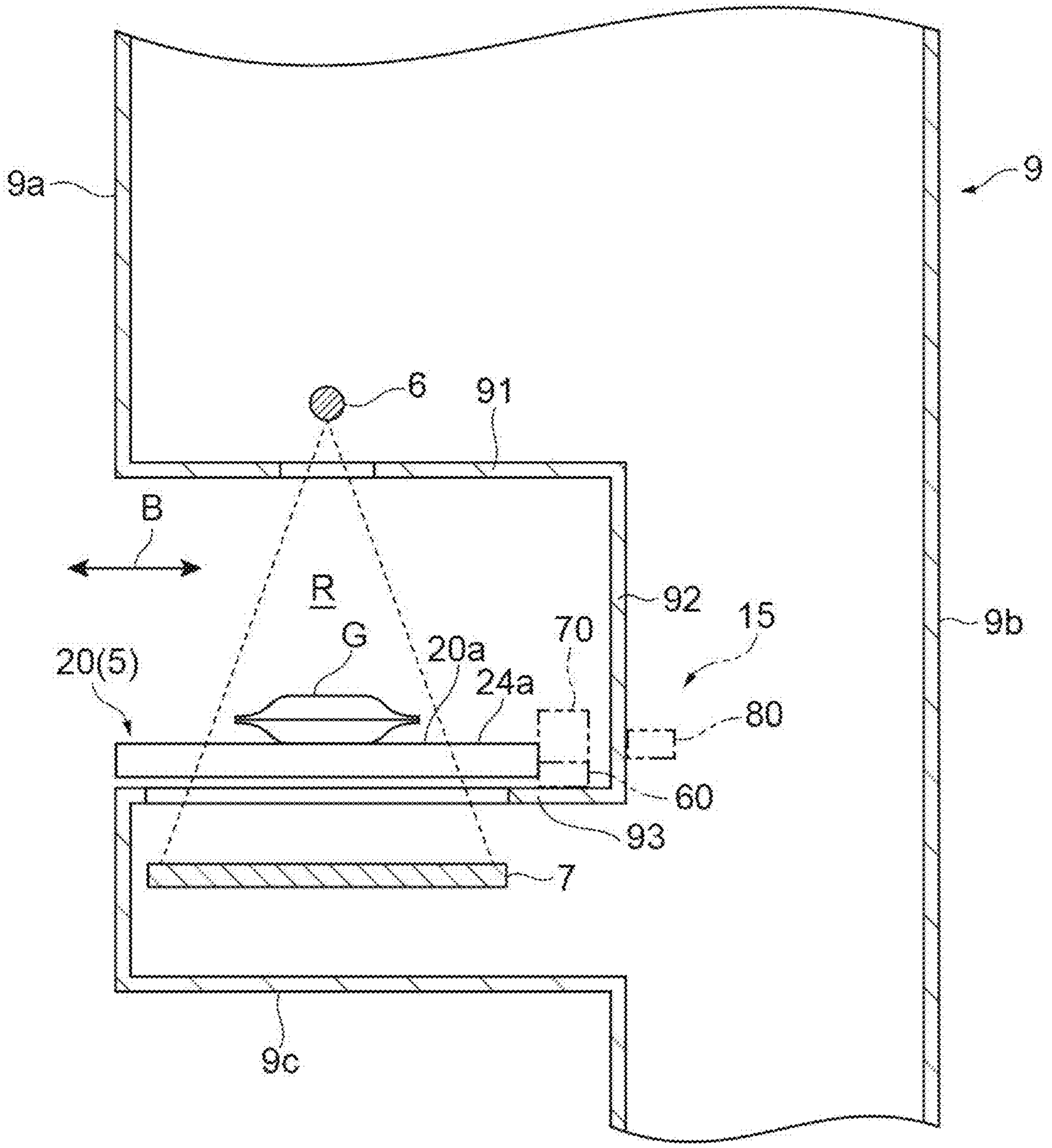
FIG. 4 is a cross-sectional view of the X-ray inspection apparatus taken along a vertical plane passing through a passing region.

As illustrated in FIGS. 1 and 4, the X-ray irradiation unit 6 is disposed, for example, in the upper portion 9*a* of the housing 9. The X-ray irradiation unit 6 irradiates the article G conveyed by the conveying unit 5 with the X-ray (electromagnetic wave). The X-ray irradiation unit 6 includes, for example, an X-ray tube that emits the X-ray, and a collimator that spreads the X-ray emitted from the X-ray tube in a fan shape in a plane perpendicular to the conveying direction A.

The X-ray detection unit 7 is disposed in the lower portion 9*c* of the housing 9. The X-ray detection unit 7 detects the X-ray emitted by the X-ray irradiation unit 6 and transmitted through the article G. The X-ray detection unit 7 is configured as, for example, a line sensor. Specifically, the X-ray detection unit 7 includes a plurality of photodiodes arranged one-dimensionally in a horizontal direction perpendicular to the conveying direction A, and a scintillator disposed on the X-ray incident side with respect to each photodiode. In this case, in the X-ray detection unit 7, the X-ray incident on the scintillator is converted into light, and the light incident on each photodiode is converted into an electric signal.

As illustrated in FIGS. 1 and 2, the display operation unit 8 is provided in the upper portion 9*a* of the housing 9 and faces forward. The display operation unit 8 displays various types of information (that is, notifies an operator of an operation state) and receives inputs of various conditions. The display operation unit 8 is, for example, a liquid crystal display, and displays an operation screen as a touch panel. In this case, the operator can input various conditions via the display operation unit 8. The display operation unit 8 provides notification of various abnormalities in the X-ray inspection apparatus 1. A notification lamp 11 also functioning as the notification unit is erected on the upper portion 9*a* of the housing 9.

The control unit 10 is disposed in the apparatus body 2. The control unit 10 controls an operation of each unit of the X-ray inspection apparatus 1. The control unit 10 includes a central processing unit (CPU), a read only memory (ROM), a random access memory (RAM), and the like. The control unit 10 receives an A/D converted signal output from the X-ray detection unit 7. The control unit 10 functions as an inspection unit that generates the X-ray transmission image of the article G based on the signal output from the X-ray detection unit 7 and inspects the article G based on the X-ray transmission image.

Figure 3:
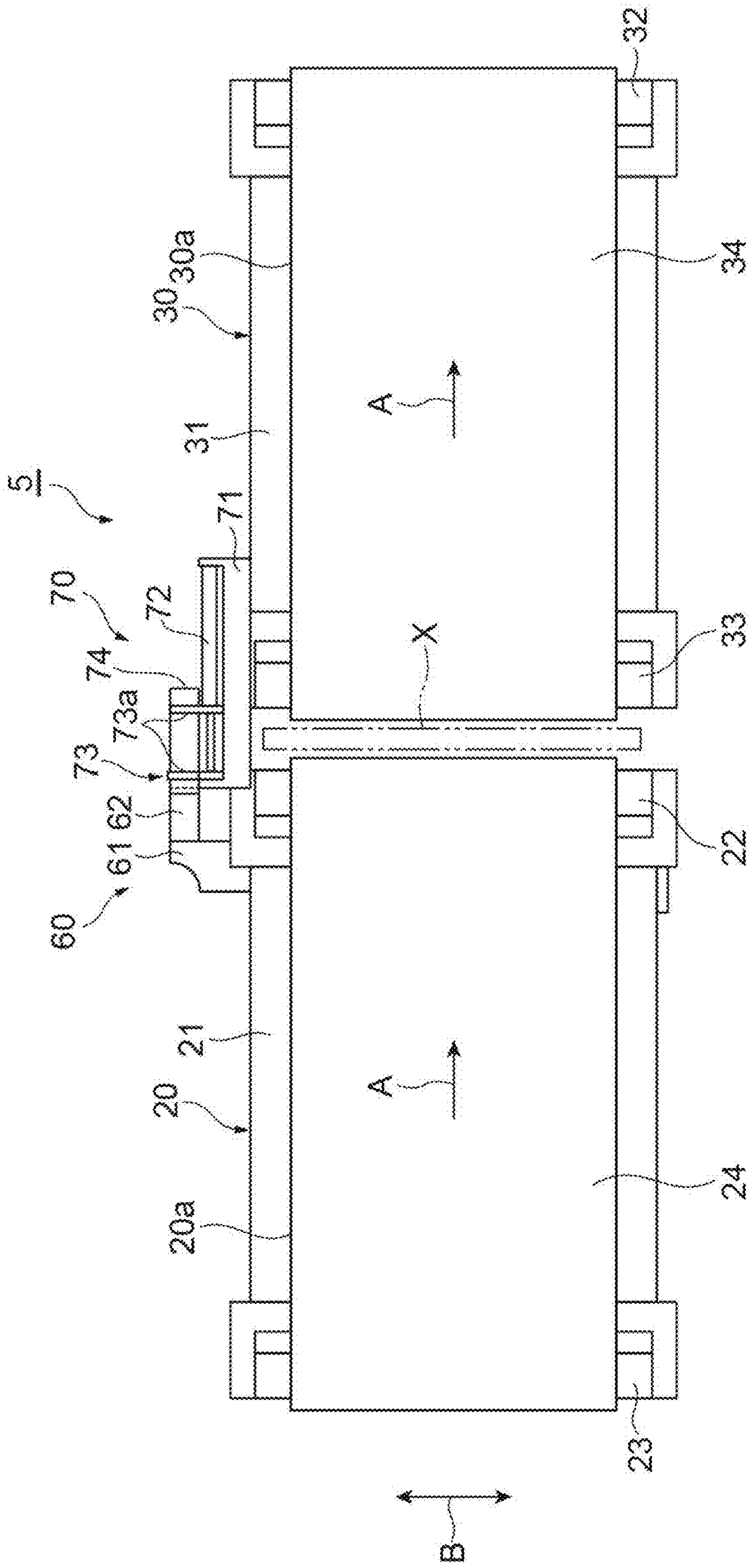
FIG. 3 is a plan view of a conveying unit in FIG. 1.

As illustrated in FIG. 3, the conveying unit 5 includes a pair of conveying units 20 and 30 and an X-ray shielding unit 40. The pair of conveying units 20 and 30 are arranged side by side with the passing region X of the X-ray (see FIG. 1) from the X-ray irradiation unit 6 to the X-ray detection unit 7 interposed therebetween. Thus, detection sensitivity of the X-ray is improved, and maintainability of the conveying unit 5 is improved. Note that the passing region X extends in a direction B. The direction B is a third direction intersecting both a first direction (that is, the conveying direction A) in which the conveying unit 5 conveys the article and a second direction (see FIG. 1) in which the X-ray irradiation unit 6 and the X-ray detection unit 7 face each other.

The conveying unit 20 disposed upstream in the conveying direction A includes a frame 21, a plurality of conveying rollers 22 and 23, and a conveying belt 24. The frame 21 is attached to the apparatus body 2 (shield box 4) via a motor box 26. The conveying rollers 22 and 23 are rotatably supported by the frame 21. As an example, the conveying roller 23 disposed upstream in the conveying direction A is a driving roller, and the conveying roller 22 disposed downstream in the conveying direction A is a driven roller. The conveying belt 24 is an endless belt, and is stretched between the conveying rollers 22 and 23. In a state where the conveying unit 20 is attached to the apparatus body 2, a part of the frame 21 is engaged with and fixed to a part of the shield box 4. The frame 21 and a conveying surface 24*a* of the conveying belt 24 extend parallel (horizontally) to the conveying direction A.

The conveying unit 30 disposed downstream in the conveying direction A includes a frame 31, a plurality of conveying rollers 32 and 33, and a conveying belt 34. The frame 31 is attached to the apparatus body 2 (shield box 4) via a motor box 36. The conveying rollers 32 and 33 are rotatably supported by the frame 31. As an example, the conveying roller 32 disposed downstream in the conveying direction A is a driving roller, and the conveying roller 33 disposed upstream in the conveying direction A is a driven roller. The conveying belt 34 is an endless belt, and is stretched between the conveying rollers 32 and 33. In a state where the conveying unit 30 is attached to the apparatus body 2, a part of the frame 31 is engaged with and fixed to a part of the shield box 4. The frame 31 and a conveying surface 34*a* of the conveying belt 34 extend parallel (horizontally) to the conveying direction A.

The X-ray inspection apparatus 1 according to the present embodiment includes a determination unit 15 that determines attachment of the conveying unit 20 and the conveying unit 30. The determination unit 15 determines attachment of both the conveying unit 20 and the conveying unit 30 without depending on the X-ray transmission image (without irradiating the X-ray from the X-ray irradiation unit 6). Hereinafter, the determination unit 15 will be described with reference to FIGS. 3 to 6.

Figure 5:
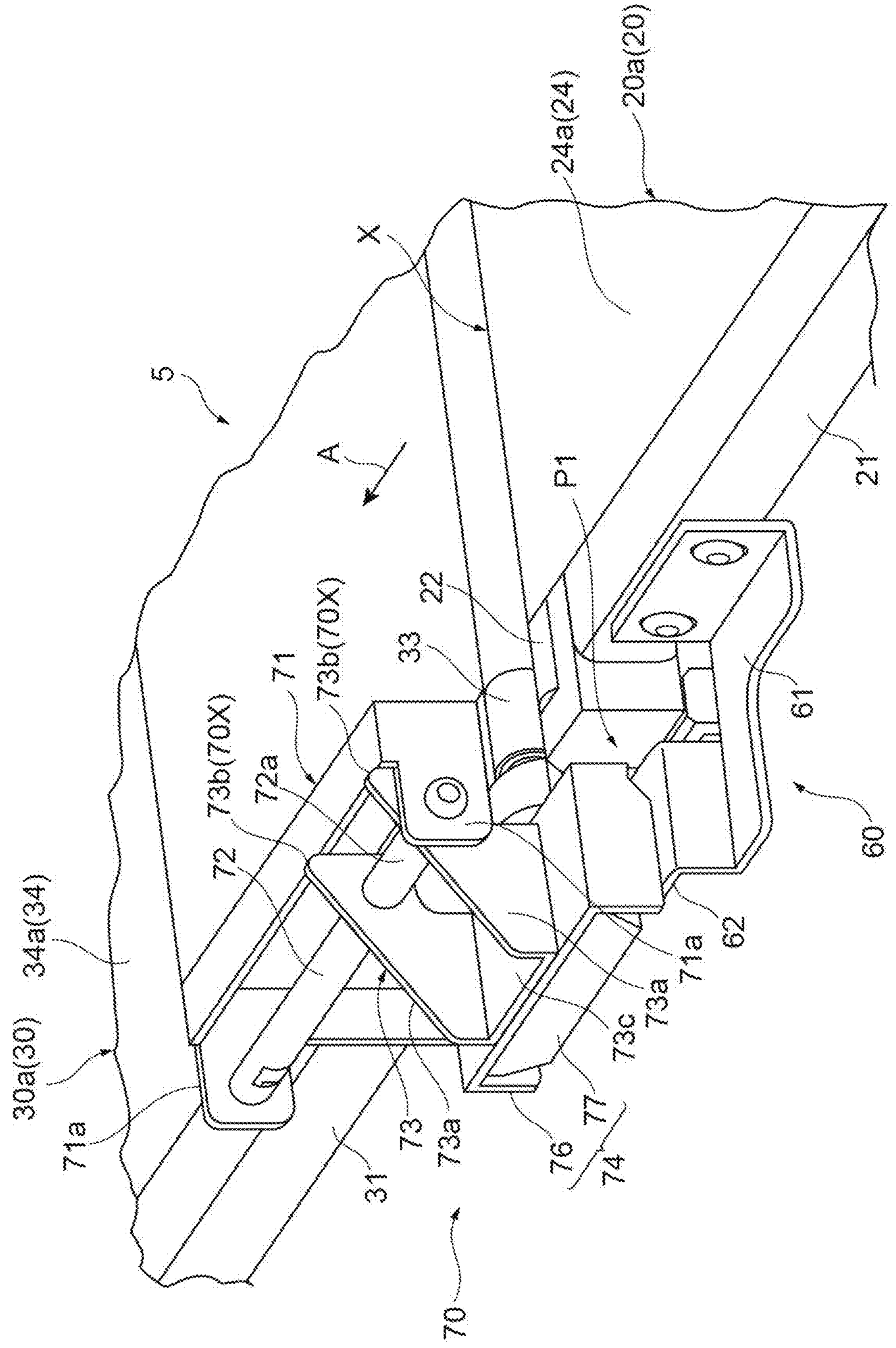
FIG. 5 is a perspective view illustrating a support portion and a swing member attached to first and second conveying units.
Figure 6:
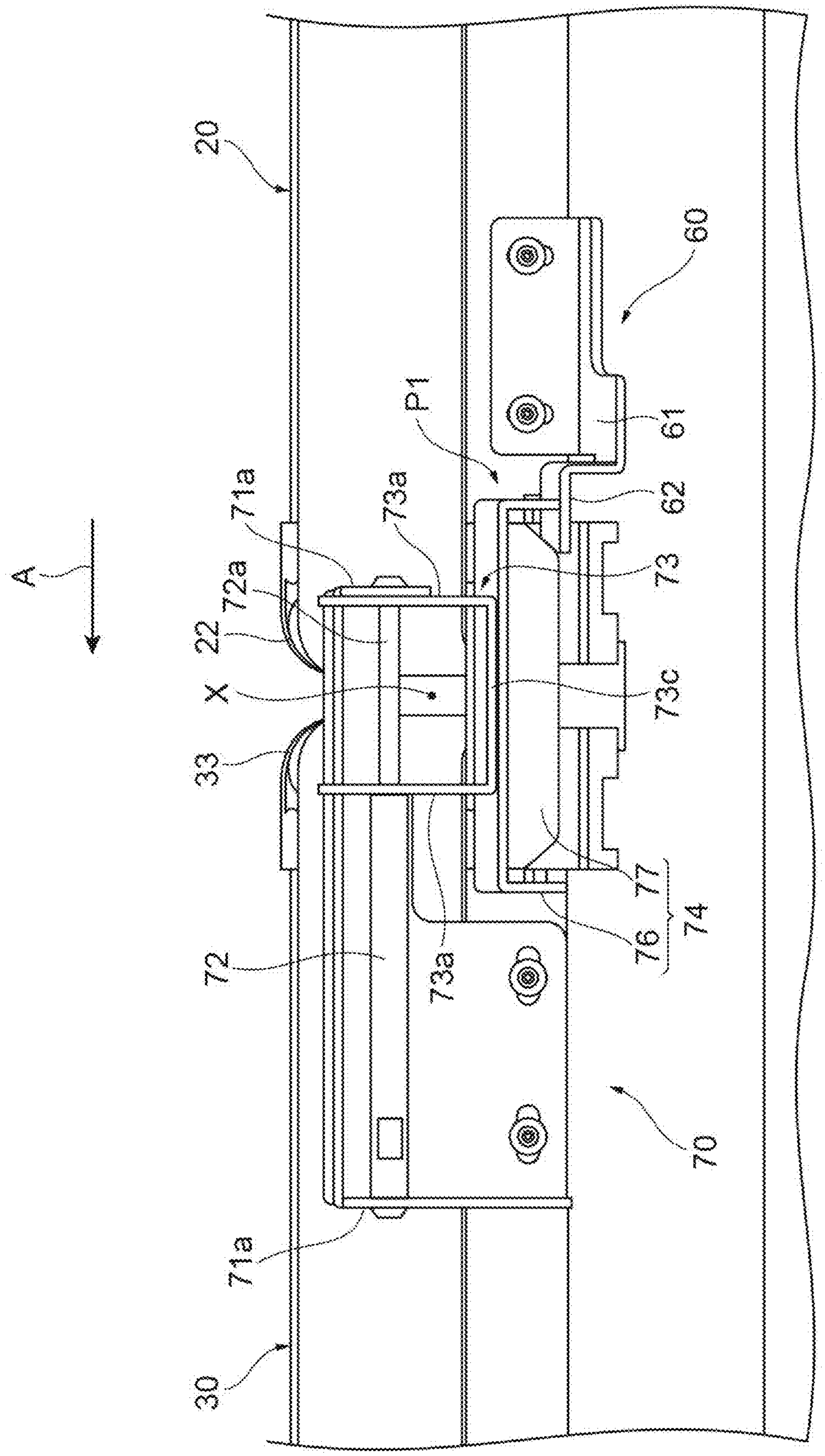
FIG. 6 is a perspective view illustrating the support portion and the swing member as viewed from a back surface side.
Figure 7A:
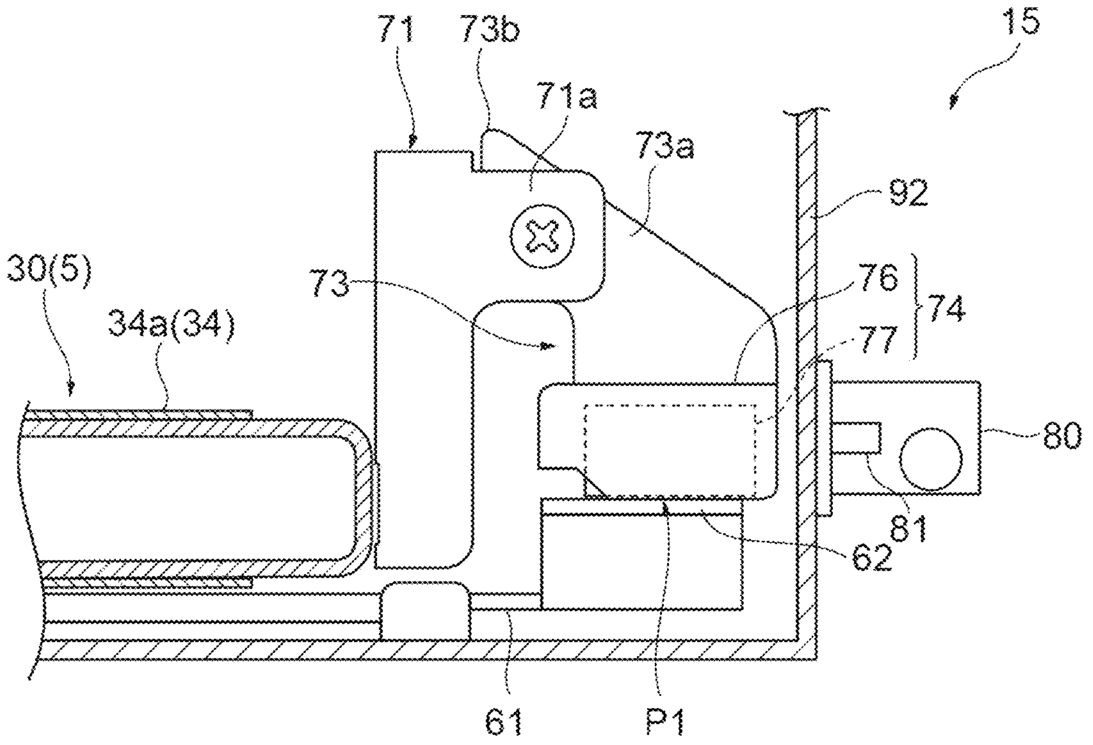
FIG. 7A is a view illustrating a state in which the first and second conveying units are attached and the swing member is placed on the support portion.

FIG. 5 is a perspective view illustrating a support portion and a swing member attached to the conveying unit 20 and the conveying unit 30. FIG. 6 is a perspective view illustrating the support portion and the swing member as viewed from a back surface side. As illustrated in FIGS. 5 and 6, the determination unit 15 includes a stopper 60 attached to the conveying unit 20 and an actuator 70 attached to the conveying unit 30. In the determination unit 15, a swing member 74 of the actuator 70 is present at a contact stop position (a predetermined position) P1 in a state where at least a part of the actuator 70 is in contact with the stopper 60. As illustrated in FIGS. 4 and 7A, the determination unit 15 includes a magnetic proximity switch (a sensor unit) 80 that detects the actuator 70 present at the contact stop position P1.

As illustrated in FIGS. 4 and 7A, the stopper 60 and the actuator 70 are arranged between the conveying surface 24*a* of the conveying unit 20 and the conveying surface 34*a* of the conveying unit 30, and a second wall portion 92 extending in the vertical direction on sides of the conveying surfaces 24*a* and 34*a*. An installation space of the stopper 60 and the actuator 70 is set in a region that is not originally used for conveyance by the conveying unit 5. On the other hand, the magnetic proximity switch 80 is disposed on an inner surface side of the second wall portion 92, that is, in the back portion 9*b*. The magnetic proximity switch 80 is fixed to the second wall portion 92 by a special screw 81 so as not to be removed by a general-purpose tool in order to prevent invalidation of an interlock. The second wall portion 92 extends between the stopper 60 and the actuator 70, and the magnetic proximity switch 80. The magnetic proximity switch 80 detects the presence of the swing member 74 in a non-contact manner. The magnetic proximity switch 80 can communicate information with the control unit 10, and transmits information indicating the presence or absence of the swing member 74 to the control unit 10. Such communication means may be provided separately from the magnetic proximity switch 80.

As illustrated in FIG. 3, the stopper 60 is fixed to the frame 21 of the conveying unit 20 and extends downstream in the conveying direction A (toward the conveying unit 30). The actuator 70 is fixed to the frame 31 of the conveying unit 30 and extends upstream in the conveying direction A (toward the conveying unit 20). Each of the conveying unit 20 and the conveying unit 30 is detachable from the apparatus body 2 when the operation of the X-ray inspection apparatus 1 is stopped. As illustrated in FIG. 2, the conveying unit 20 is rotated as a whole about a pin 27 attached to the frame 21, as the operator lifts a portion near the conveying roller 22 by hand. The conveying unit 30 is rotated as a whole about a pin 37 attached to the frame 31, as the operator lifts a portion near the conveying roller 33 by hand. Both a rotation axis L2 passing through the pin 27 and a rotation axis L3 passing through the pin 37 extend parallel to the direction B. The conveying unit 20 and the conveying unit 30 are separated from the apparatus body 2 (shield box 4) by being respectively detached from the motor box 26 and the motor box 36 after rotation. At this time, since the stopper 60 is integrated with the frame 21, it is removed together with the conveying unit 20. Since the actuator 70 is integrated with the frame 31, it is removed together with the conveying unit 30.

Configurations of the stopper 60 and the actuator 70 will be described in detail. As illustrated in FIGS. 5 and 6, the stopper 60 includes a base plate 61 fixed to the frame 21 and a support base (support portion) 62 provided at a tip of the base plate 61 and extending, for example, flatly. An upper surface of the support base 62 is, for example, parallel to the conveying surface 24*a* of the conveying belt 24. The actuator 70 includes a base portion 71 fixed to the frame 31, a support shaft 72 supported by a pair of support plate portions 71*a* of the base portion 71, and an arm member 73 and a swing member 74 swingably supported by the support shaft 72. The support shaft 72 is, for example, parallel to the conveying surface 34*a* of the conveying belt 34.

As illustrated in FIGS. 5 and 6, the support shaft 72 includes a small diameter shaft portion 72*a* provided at an upstream portion thereof in the conveying direction A. The arm member 73 includes a pair of triangular arm portions 73*a* swingably supported by the small diameter shaft portion 72*a* and a bottom plate portion 73*c* provided at a tip of the arm portion 73*a*. The swing member 74 includes a holding portion 76 to which the bottom plate portion 73*c* is fixed and a magnet 77 held by the holding portion 76. The stopper 60 is manufactured by, for example, bending a plate material made of metal. The actuator 70, except for the magnet 77, is manufactured by, for example, bending a plate material made of metal. An outer surface of the magnet 77 located farther from the support shaft 72 is not covered by the holding portion 76 and is exposed to the outside.

The magnet 77 is, for example, a block-shaped permanent magnet. The swing member 74 including the holding portion 76 and the magnet 77 integrated together swings in a predetermined range around the support shaft 72. As illustrated in FIGS. 5 and 7A, the arm portion 73*a* includes a base end portion 73*b* having an acute angle shape on the opposite side of the swing member 74 with respect to the support shaft 72. When the arm member 73 swings counterclockwise as illustrated in FIG. 7A, since the base end portion 73*b* of the arm portion 73*a* comes into contact with a part of the base portion 71, further swinging (rotation) of the arm member 73 is stopped. Further, when the arm member 73 swings clockwise illustrated in FIG. 7A, since the holding portion 76 of the arm portion 73*a* comes into contact with a part of the conveying unit 20 and the conveying unit 30 (for example, a part of the frame 31 or the frame 21), further swinging (rotation) of the arm member 73 is stopped. As described above, the conveying unit 30 is provided with a restriction mechanism 70X that restricts a swing range of the swing member 74.

In a state where the conveying unit 20 and the conveying unit 30 are attached to the apparatus body 2, as illustrated in FIGS. 3 and 6, the support base 62 of the stopper 60 and the swing member 74 of the actuator 70 are located between the conveying unit 20 and the conveying unit 30 in the conveying direction A. In other words, the support base 62 and the swing member 74 are located at positions where at least a part thereof overlaps with each other in plan view. A position where the support base 62 and the swing member 74 overlap is a contact position in the determination unit 15. If the conveying unit 20 is not attached but the conveying unit 30 is attached, the support base 62 is not present at the contact position. When the conveying unit 30 is attached to the apparatus body 2 and located at an operable position, the arm member 73 and the swing member 74 hang down by their own weight and are located at a natural hanging position P2 (see FIG. 7B). The natural hanging position P2 is within a swing range of the arm member 73 described above.

Figure 7B:
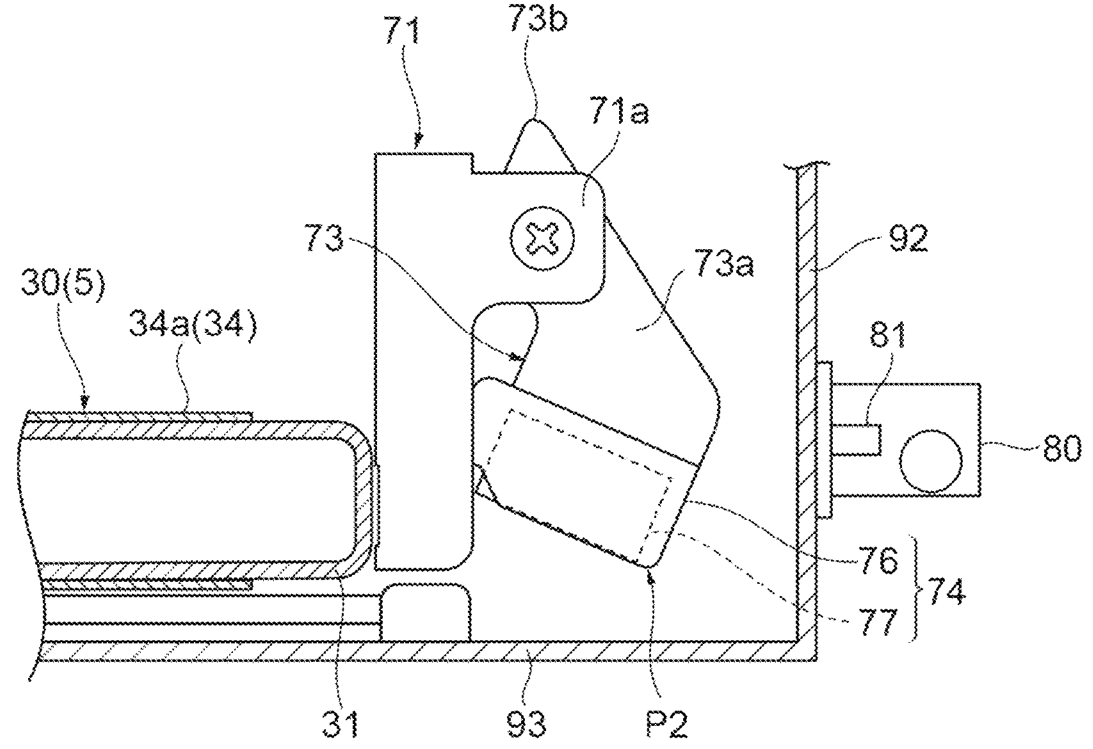
FIG. 7B is a view illustrating a state in which the first conveying unit is not attached, the second conveying unit is attached, and the swing member hangs down by its own weight.

As illustrated in FIG. 7A, the magnetic proximity switch 80 detects that the swing member 74 is present at the contact stop position P1 in a state where the swing member 74 is in contact with the support base 62 (in the present embodiment, the holding portion 76 is placed on the support base 62). When the swing member 74 is at the contact stop position P1, a sensor surface of the magnetic proximity switch 80 is parallel to the outer surface of the magnet 77. The magnetic proximity switch 80 approaches the contact stop position P1. The contact stop position P1 is equal to the contact position described above. The contact position, that is, a position of a top surface of support base 62 is located closer to the magnetic proximity switch 80 than immediately below the support shaft 72 (or the support plate portion 71*a*). As illustrated in FIG. 7B, when the swing member 74 is lowered to the natural hanging position P2 due to the absence of the support base 62, the magnetic proximity switch 80 detects that the swing member 74 is not present at the contact stop position P1. That is, the magnet 77 present at the contact stop position P1 turns on the magnetic proximity switch 80, and the magnet 77 present at the natural hanging position P2 turns off the magnetic proximity switch 80. The natural hanging position P2 is located immediately below the support shaft 72 (or the support plate portion 71*a*), and thus is farther from the magnetic proximity switch 80 than the contact stop position P1.

As described above, the determination unit 15 is an interlock switch mechanism that detects that two conveyors are appropriately installed. The control unit 10 determines whether both of the conveying units 20 and 30 are attached on the basis of the detection result of the magnetic proximity switch 80.

For example, in a case where the conveying unit 20 is attached and the conveying unit 30 is not attached, since the swing member 74 (magnet 77) is not present near the magnetic proximity switch 80, the control unit 10 can determine that both of the conveying units 20 and 30 are not attached. Further, in a case where the conveying unit 30 is attached and the conveying unit 20 is not attached, since the swing member 74 is located at the natural hanging position P2, the control unit 10 can determine that both of the conveying units 20 and 30 are not attached.

According to an appropriate conveyor attachment procedure, the operator first attaches the conveying unit 20 and subsequently attaches the conveying unit 30. Thus, the actuator 70 approaches the stopper 60 from above, and the holding portion 76 is placed on the support base 62. In a case where both of the pair of conveying units 20 and 30 are attached, since the swing member 74 is located at the contact stop position P1, the control unit 10 can determine that both of the conveying units 20 and 30 are attached. Note that in a case where the conveying unit 30 is attached first, since the presence of the actuator 70 prevents the stopper 60 from descending, it is physically impossible to attach the conveying unit 20. Therefore, also in this case, the swing member 74 is located at the natural hanging position P2, and the control unit 10 can determine that both of the conveying units 20 and 30 are not attached.

When determining that both of the pair of conveying units 20 and 30 are not attached, the control unit 10 stops X-ray irradiation by the X-ray irradiation unit 6. Further, the control unit 10 controls the display operation unit 8 to display a result of determination described above. The control unit 10 controls the notification lamp 11 to provide notification of the result of the determination described above.

According to the X-ray inspection apparatus 1 of the present embodiment, when the conveying unit 20 is attached and the conveying unit 30 is further attached, at least a part of the swing member 74 is in contact with the support base 62 and located at the contact stop position P1. Then, only when this state (condition) is established, the magnetic proximity switch 80 detects that the swing member 74 is present at the predetermined position. Therefore, attachment of the pair of conveying units 20 and 30 can be determined only by one magnetic proximity switch 80.

A position of the swing member 74 can be detected in a non-contact manner by detection of the magnet 77 by the magnetic proximity switch 80. Thus, configuration of the magnetic proximity switch 80 is simplified, and the degree of freedom in layout is also high.

Since the magnetic proximity switch 80 is disposed inside the housing 9, a wide area of the conveying surfaces 24*a* and 34*a* can be secured.

Since the restriction mechanism 70X restricts the swing range of the swing member 74, when the conveying unit 30 is attached, the swing member 74 can be appropriately and reliably brought into contact with the support base 62.

In the X-ray inspection apparatus 1, the control unit 10 stops the X-ray irradiation when the determination unit 15 does not determine attachment of the conveying units 20 and 30. This prevents the X-ray inspection apparatus 1 from being erroneously operated.

Further, in the X-ray inspection apparatus 1, when the determination unit 15 does not determine attachment of the conveying units 20 and 30, the control unit 10 provides notification that there is an abnormality. Thus, the X-ray inspection apparatus 1 is prevented from being erroneously operated, and the X-ray inspection apparatus 1 can be stopped even when any of the conveying units is detached during operation.

Although the embodiment of the present disclosure has been described above, the present invention is not limited to the above embodiment. For example, the actuator 70 may be attached to the conveying unit 20, and the stopper 60 may be attached to the conveying unit 30. In this case, the conveying unit 20 corresponds to the second conveying unit, and the conveying unit 30 corresponds to the first conveying unit. The sensor unit may be a contact type switch instead of the magnetic proximity switch 80.

The electromagnetic wave irradiated by the irradiation unit and detected by the detection unit is not limited to the X-ray.

At least a part of the embodiment described above may be arbitrarily combined.

What is claimed is:

1. An X-ray inspection apparatus comprising:

a conveying unit configured to convey an article;

an irradiation unit configured to irradiate the article conveyed by the conveying unit with an electromagnetic wave;

a detection unit configured to detect the electromagnetic wave emitted from the irradiation unit and transmitted through the article;

an inspection unit configured to inspect the article based on a detection result of the detection unit; and a determination unit configured to determine attachment of the conveying unit, wherein the conveying unit includes first and second conveying units arranged side by side with a passing region through which the electromagnetic wave from the irradiation unit to the detection unit passes therebetween, and the determination unit includes:

a support portion attached to the first conveying unit;

a swing member swingably attached to the second conveying unit and at least partially in contact with the support portion when the first and second conveying units are attached; and a switch configured to detect whether the swing member is present at a predetermined position in a state where the swing member is in contact with the support portion.

2. The X-ray inspection apparatus according to claim 1, wherein the swing member includes a magnet, and the switch is a magnetic proximity switch for detecting whether the magnet is present at a predetermined position.

3. The X-ray inspection apparatus according to claim 1, wherein the support portion and the swing member are arranged between a conveying surface of the first and second conveying units and a side wall of a housing extending in a vertical direction on a side of the conveying surface, and the switch is disposed on an inner surface side of the side wall.

4. The X-ray inspection apparatus according to claim 1, wherein the second conveying unit is provided with a restriction mechanism for restricting a swing range of the swing member.

5. The X-ray inspection apparatus according to claim 1, wherein the inspection unit stops irradiation with the electromagnetic wave when the determination unit does not determine attachment of the first and second conveying units.

6. The X-ray inspection apparatus according to claim 1, wherein the inspection unit provides notification that there is an abnormality when the determination unit does not determine attachment of the first and second conveying units.

* * * * *